June 27, 1944.  P. W. THORNHILL  2,352,351
SHOCK ABSORBER
Filed Dec. 17, 1941   2 Sheets-Sheet 1

Inventor:
P. W. Thornhill
By: Stevens & Davis
Attys.

June 27, 1944.  P. W. THORNHILL  2,352,351
SHOCK ABSORBER
Filed Dec. 17, 1941  2 Sheets-Sheet 2
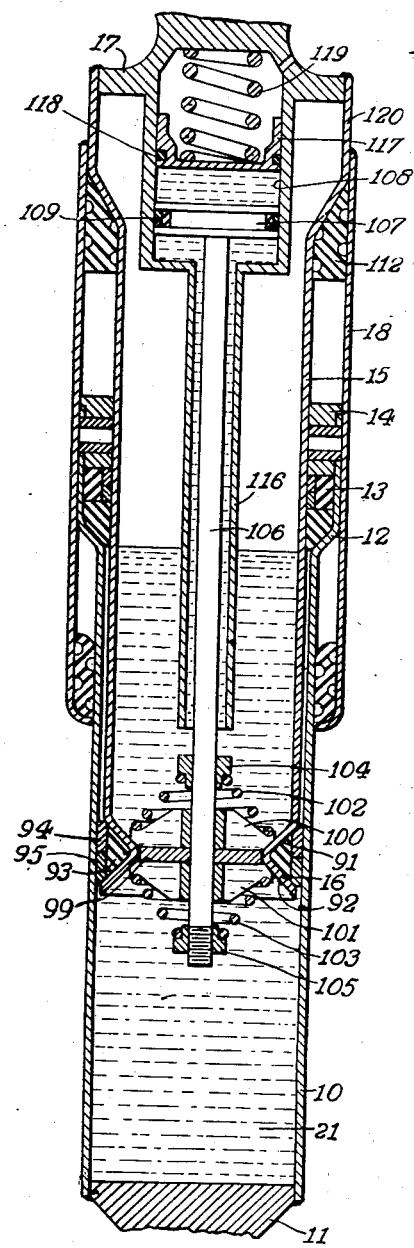
Inventor:-
P. W. Thornhill
By: Stevens & Davis
Attys.

Patented June 27, 1944

2,352,351

UNITED STATES PATENT OFFICE 2,352,351

SHOCK ABSORBER

Peter Warborn Thornhill, Leamington Spa, England, assignor to John Henry Onions, Coventry, England Application December 17, 1941, Serial No. 423,380
In Great Britain April 8, 1941

16 Claims. (Cl. 267—64)

This invention relates to shock absorbers of the type in which liquid is used for damping relative movement of a pair of members, usually a cylinder, and a plunger telescopically mounted therein, resilient means such as a quantity of compressed gas and/or one or more springs being provided to sustain the load which is normally carried by the shock absorber due to the weight of the vehicle or equivalent upon which the shock absorber is installed.

It is an object of the invention to provide an extremely simple yet effective form of shock absorber, more especially for motor and like vehicles, said shock absorber being arranged with a view to producing particularly smooth running of the vehicle.

It is a further object of the invention to provide an improved shock absorber in which smooth running of the vehicle or equivalent is produced by ensuring that the upward force which the shock absorber exerts upon the vehicle is never substantially greater than the normal static load on the shock absorber.

Another object is to provide an improved form of shock absorber in which the controlling means for the usual damping valve device automatically adjusts itself to suit variations in the static load on the shock absorber.

The invention is illustrated by way of example in the accompanying drawings, in which:

Figure 5 is a sectional elevation of another form of shock absorber; and

Figure 6 is a diagrammatic sectional view of an alternative form of damping valve device.

Figure 1:
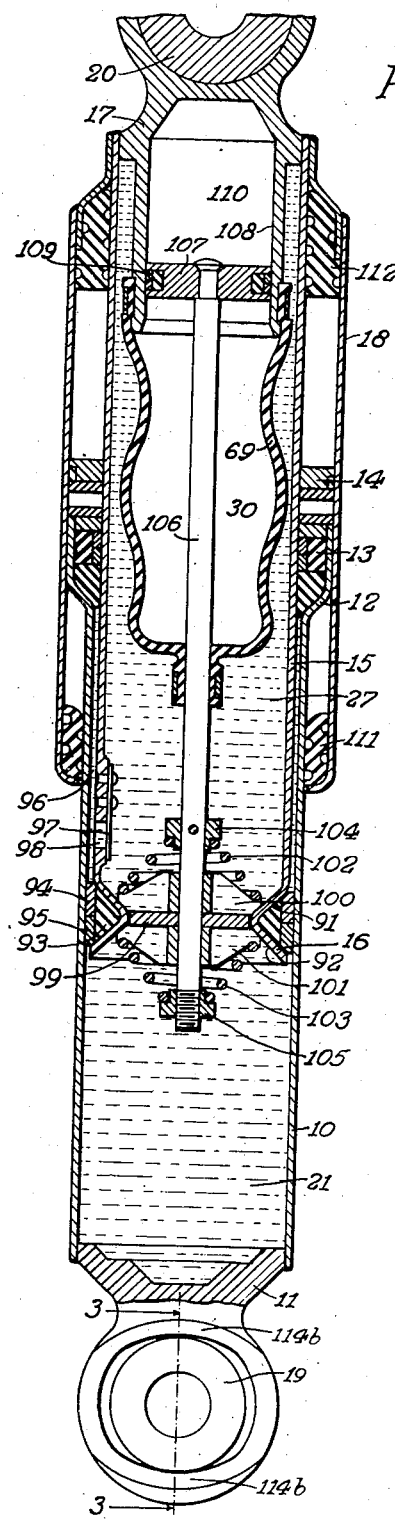
Figure 1 is a sectional elevation of one construction of vehicle shock-absorbing suspension unit.

The shock absorbers shown in the drawings are intended primarily for use on motor cars, tanks, and other land vehicles, but of course the principles involved can be applied equally well to shock absorbers or struts for use in the undercarriages, tail wheels and nose wheels of aircraft. In each case the shock absorber or strut is arranged so that shortening of a pair of telescopic members, as would normally be caused by applying the usual load to the shock absorber, causes energy to be stored in a resilient medium, which latter, after a predetermined amount of movement has occurred, is capable of supporting the whole load on the shock absorber. In other words, the shock absorber comprises springing means as well as means for damping relative movement of the shock absorber elements. Some shock absorbers of this form are described in my co-pending application Serial No. 372,417, filed December 30, 1940, now Patent No. 2,308,404, issued January 12, 1943.

In each of the arrangements shown in the drawings one of the shock absorber elements comprises a tubular cylinder 10, which is closed at its lower end by a plug 11 and is enlarged in diameter at 12 to accommodate a packing assembly, which is indicated generally at 13, this being held in position by a nut or ring 14. The other element takes the form of a tubular plunger 15, which is slidable in a liquid-tight manner through the packing 13 and has its inner end closed by a piston head 16, the opposite end of said plunger tube 15 being closed by a cap 17 serving to carry a tubular shield 18 for protecting from dust, dirt and other foreign matter the outer sliding surface of said plunger tube 15. The plug 11 and cap 17 are shaped to form fixing lugs, which, in Figure 1, are shown partly broken away and are provided with tubular bearing bushes 19 and 20 respectively to engage with transverse pins (not shown) carried by the two parts of the vehicle or equivalent requiring to move relatively, for example the axle mounting and the chassis, in the case of a motor vehicle.

In the construction shown in Figure 1 the plunger tube 15 is formed at its lower end with a groove 91, which is substantially triangular in cross section and is rolled, pressed or otherwise formed in the tube so as to produce an inwardly directed "flange" 92 constituting a constriction. The groove 91 accommodates a piston packing comprising a ring 93 composed of soft rubber or like material, and also a pair of hard split rings 94 and 95 which are composed of metal or synthetic resin so as to co-operate with the internal surface of the cylinder tube 10 in such a way as to allow a very slight leakage when the shock absorber is operating. In order to permit working liquid to escape from the space 96 between the overlapping parts of the cylinder and plunger tubes 10 and 15 during extension of the shock absorber, a non-return valve conveniently comprising a flap 97 composed of spring steel is fitted within the plunger tube 15 and is adapted to cover an aperture 98 therein. During compression, on the other hand, when relatively high pressure is present in the space 21, the packing rings 94, 95 prevent the rapid inflow of liquid from the space 21 to the space 96, thus avoiding overstraining the main packing 13.

The damping valve device in this example comprises a circular plate 99 which is of such a diameter that it is able to slide freely through but substantially fill the constriction caused by the "flange" 92, said plate normally being held in its closed position by a pair of spider members 100 and 101 which are urged into engagement with opposite sides of the "flange" 92 by conical compression springs 102 and 103 respectively. The outer ends of these springs bear against collars 104 and 105 which are carried upon an axial rod 106. This rod is freely slidable through the spiders 100 and 101 and also through the plate 99, and it carries at its upper end a piston member 107 adapted to slide within an auxiliary cylinder 108 formed in one with the plug member 17. The compressed air for providing the necessary resilience is accommodated within a flexible rubber bag 69 secured between the auxiliary cylinder 108 and the axial rod 106 respectively, while the damping liquid is arranged to fill the surrounding space within the plunger tube 15 as indicated. The damping liquid is inserted through the usual plug opening in the member 11, and the air is subsequently pumped in through a valve of the usual type in the member 17 until the pressure reaches a value appropriate to the desired range of axial load to be borne by the device. As the drawings are diagrammatic neither the plugged opening in the member 11 nor the air valve is shown.

The auxiliary cylinder 108 is completely closed at its upper part, and as the packing of the piston 107, indicated generally at 109, is adapted to allow a slight leakage of air, it will be appreciated that when the shock absorber is in a loaded condition, but is in equilibrium, the air pressure within the bag 69 and that within the working space 110 of the auxiliary cylinder 108 become equal, the springs 102 and 103 meanwhile holding the piston 107 in a predetermined normal position with the damping valve device in a closed condition.

The diameter of the piston 107 is arranged to be substantially equal to that of the plate 99, so that the plate 99 and the piston 107, taken in conjunction with the axial rod 106, form a balanced assembly as far as the action of the fluid pressure in the spaces 27, 30 is concerned.

In order that the operation of the shock absorber may be clearly understood, it will be supposed that said shock absorber is operatively interposed between the chassis of a vehicle and one of the wheels thereof so as to transmit to said wheel a predetermined gravitational load constituting part of the weight of the vehicle. This load on the shock absorber will be called W and the corresponding intensity of fluid pressure in the shock absorber necessary to support the load W will be regarded as being P, the actual value of P depending, of course, upon the cross sectional area of the plunger.

Figure 2:
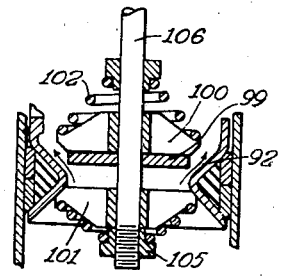
Figure 2 is a fragmentary sectional view showing the damping valve device in one of its open positions.

When the vehicle is travelling along a smooth surface the shock absorber is under normal static conditions, the load, as mentioned above, being W and the internal fluid pressure being P. When the wheel in question strikes and rides over a bump, the chassis of the vehicle tends to follow its original level course, with the result that the cylinder 10 of the shock absorber rises relative to the plunger 15, thus raising the pressure of the liquid in the working space 21 of the cylinder. The liquid is able to escape freely from the working space 21 of the cylinder 10, as the plate 99 lifts easily against the force of the spring 102, and thus the upward force exerted upon the vehicle body during contraction of the shock absorber is reduced to a minimum. The liquid which enters the working space 27 within the plunger causes the bag 69 to contract and so raises the compression of the air within the space 30. The air in the space 110 is, however, at the normal "static" pressure, and as the packing 109 of the auxiliary piston 107 is only capable of leaking very slowly, the auxiliary piston 107 is raised owing to the increase of the air pressure acting upon its under surface. Thus the collar 105 contacts with the spider member 101 and positively prevents the plate 99 from moving downwards, although said plate is still able to lift, as shown in Figure 2, to allow liquid to escape freely from the cylinder space 21. By the end of the contracting stroke the pressure within the working spaces 21, 27 and 30 will be greater than P, depending upon the extent of the contraction, and the slight upward movement of the piston 107 will have raised the air pressure in the space 110 to a value slightly greater than P. As the recoil stroke of the shock absorber commences the pressure in the working space 21 rapidly falls, for the plate 99 is supported by the upward thrust on the auxiliary piston 107 and therefore does not allow damping liquid to escape from the space 27 in the plunger tube 15. When, however, the pressure in the space 21 drops below that in the auxiliary cylinder space 110, i. e. to a value of about P, the device comprising the parts 107, 106, 105, 101 and 99 (which is balanced as far as the pressure in the spaces 27 and 30 is concerned) can move bodily downwards under the effect of the pressure in the space 110, thus permitting liquid to re-enter the cylinder space 21, the supply being automatically cut off, however, if the pressure tends to rise above P. This action proceeds until the shock absorber regains its normal length, when the pressure throughout the shock absorber becomes equal to P.

A similar action occurs when the wheel falls into a depression in the road surface. The pressure liquid from the working space 27 is able to enter the cylinder working space 21 quite freely during the extension of the shock absorber, the plate 99 moving downwards against the spring 103. As the pressure in the plunger tube 15 falls, the piston 107 is forced downwards by the air trapped within the auxiliary cylinder space 110; thus the plate 99 is held down and prevents the liquid from being forced out of the working space 21 until it regains a pressure P sufficient to support the static load on the shock absorber.

During operation of the shock absorber each single reciprocation takes place in a fraction of a second, and therefore the amount of air in the space 110 cannot change appreciably. When, however, the static load is changed (for instance by the loading or unloading of the vehicle, or by an increase or decrease in the number of passengers) then the corresponding change in the fluid pressure within the space 30 is transferred to the space 110 within a short time (say a minute or two) owing to the slow leakage permitted by the packing 109.

The tubular shield 18 contains at its lower part an annular rubber cushion member 111 to limit the extending movement of the shock absorber, while an upper cushion member 112 is arranged to form a buffer when the shock absorber reaches its fully shortened state.

Figure 3:
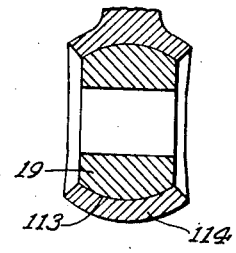
Figure 3 is a sectional elevation taken on the line 3—3 of Figure 1.
Figure 4:
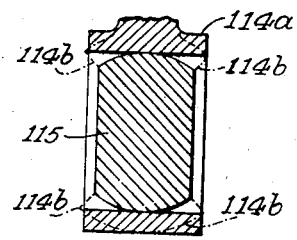
Figure 4 is a diagram showing the method by which the ball and socket attachment lugs are produced.

The attachment bushes 19 and 20 carried by the plug members 11 and 17 respectively are arranged to have a universal movement within limits so as to avoid straining the shock absorber tubes, and the housings for these bushes are preferably constructed in the manner shown more particularly in Figures 3 and 4. It will be seen, for example, that the bush 19 (Figure 3) has a part-spherical outer surface 113 which fits rotatably within a correspondingly shaped socket ring 114 forming part of the plug member 11. This socket ring 114 is formed initially as a substantially parallel tube 114a, as seen in Figure 4, and within this is positioned a former member 115 which is composed of hard material and which has a similar outer shape to the bearing bush 19. The upper and lower parts of the tubular portion 114a are then bent downwardly, as indicated in broken lines at 114b, and as will also be seen in Figure 1. Lateral displacement of the former member 115 is thus prevented, but as the pressing is confined to the upper and lower parts of the tube 114a, the former member 115 can be removed by twisting it through a right angle, as viewed in Figure 4, and then sliding it laterally. The appropriate bearing bush 19 can then be inserted by reversing these movements.

If desired, instead of utilising the compressed air as the working medium for the auxiliary piston 107 the shock absorber may be arranged so that the auxiliary piston is acted upon by the damping liquid, and such a construction is illustrated in Figure 5. It will be seen that the auxiliary cylinder 108 is fitted slidably with an auxiliary piston 107 having a packing 109 adapted as before to have an appreciable but relatively slow leakage. This piston is connected by an axial rod 106 to a damping valve device comprising a plate 99 disposed between a pair of spider members 100 and 101, as in the preceding example. The axial rod 106, however, is surrounded by a tube 116, which extends downwardly from the lower part of the auxiliary cylinder 108 to a position well below the normal level of the damping liquid. This liquid completely fills the tube 116 and that part of the auxiliary cylinder 108 disposed below a floating piston 117, which has a liquid-tight packing 118 and is urged downwards by a coiled compression spring 119 producing a force on the floating piston 117 equal to the upward force produced by the working fluid when the shock absorber is bearing its normal static load. The auxiliary piston 107 is normally held by the springs 102 and 103 at a position about the middle of its normal stroke, the liquid pressures above and below the auxiliary piston 107 being substantially equalised on account of the leakage permitted by the packing 109. The diameter of the auxiliary piston 107 is, of course, equal to that of the floating piston 117 and is also the same as that of the plate 99. Thus when the shock absorber is shortened, as, for example, when the wheel to which it is connected strikes a bump in the road surface, this movement is unobstructed by the damping liquid, for the plate 99 is able to move freely in an upward direction, as shown in Figure 2. During this movement the fluid pressure in the plunger tube 15 of course increases so that some of the damping liquid passes up through the tube 116 and lifts the auxiliary piston 107, duly compressing the spring 119. During the succeeding rebound stroke the lower spider 101 serves to hold the plate 99 in its closed position until such time as the pressure of the liquid in the cylinder 10 falls below its normal static value. As the diameter of the auxiliary piston 107 is substantially equal to that of the plate 99 the parts 107, 106, 99, 101 and 105 are in a state of balance with respect to the fluid pressure in the plunger tube 15, so that as soon as the liquid pressure in the cylinder 10 falls below the normal static value the spring 119 is able to lower the rod 106, the plate 99 then being depressible by the liquid in the plunger tube, which liquid then flows into the cylinder tube 10 so as to maintain the pressure therein at a value substantially equal to the normal static value. In this way the gravitational load on the shock absorber is at all times adequately supported without the upward force being sufficient in magnitude to impart any substantial upward movement to the vehicle body or equivalent.

It will be seen that although the constructional features of the shock absorber shown in Figure 5 are somewhat the same as those of the device in Figure 1, the plunger tube 15 is enlarged at its upper end, as indicated at 120. This gives an increased space within the plunger tube for the accommodation of compressed air and at the same time forms a convenient attachment for the tubular shield 18.

The modified form of damping valve device shown in Figure 6 is intended to be a substitute for that in Figures 1 and 2. The axial rod 106 has its movement positively limited by collars 124 and 125 co-operating with a stop member 126 carried by the plunger tube 15. The valve member itself comprises a cylindrical block 127 which is freely slidable upon the axial rod 106 between the collar 125 and a collar 128 upon the lower extremity of the rod, the free movement of the block 127 upon the rod 106 being substantially the same as the free movement of said rod 106 relative to the stop member 126. Notches or grooves are formed around the upper and lower edges of the block 127, as indicated at 129, but an uncut portion 130 is left around the middle of the block 127 so that when the latter is in the position shown in the drawing the constriction at the lower end of the plunger tube 15 is substantially completely closed. It will be seen that the block 127 is caused to assume this position whenever the rod 106 is fully raised or is fully lowered, and in this state said block 127 acts in the capacity of a non-return valve, as do the damping devices in the previous examples. Preferably pairs of opposing light centering springs (not shown) are provided to co-operate with the plunger tube 15 so as to hold the rod 106 and also the block 127 resiliently at positions corresponding to the mid points of their respective strokes.

It will be appreciated that the constructions described are given merely as examples of the invention and that various modifications are possible. For instance, where a rubber bag or sac is used to separate the compressed air or other gas from the damping liquid the air may be accommodated between said rubber bag or sac and the plunger tube, the interior of said bag or sac being connected with the working space 21 of the cylinder by way of the damping valve device. Further, the constructional details of the damping valve itself may be modified. The improved shock absorbers may be adapted to operate with

What I claim is:

1. A telescopic shock absorbing suspension unit comprising a cylinder element, a hollow plunger element sliding therein, a damping valve device at the inner end of the plunger element, damping liquid within the cylinder element and extending through the damping valve device to occupy part of the working space within the plunger element, compressed gas disposed within the space in the plunger element to support resiliently the axial load on the shock absorber, an auxiliary piston which is subject to the action of a confined quantity of compressed gas at a pressure determined by the static axial load on the shock absorber, and an axial rod connecting the auxiliary piston with the said damping valve device at the inner end of the plunger element so as to urge said valve device in either direction from its position of equilibrium as the fluid pressure in the plunger element becomes greater and less than its static value.

2. A telescopic shock absorbing suspension unit comprising a cylinder element, a hollow plunger element sliding therein, a damping valve device at the inner end of the plunger element, damping liquid within the cylinder element and extending through the damping valve device into the plunger element, compressed gas within the plunger element and controlling means which are responsive to changes in the fluid pressure in the plunger element and which are connected with the damping valve device to modify the action thereof, said damping valve device comprising a constriction in the plunger element, a rod extending axially therethrough, a valve member slidable through the constriction so as to block the latter when in its normal intermediate position, and means carried by the axial rod for preventing the valve member from moving past this intermediate position when the pressure in the plunger element changes substantially from its static value.

3. In a telescopic shock absorbing suspension unit of the character described, a plunger element comprising a tubular member formed at one end with a circumferential indentation, said indentation defining on the outside of the member a groove, and upon the interior of the member a constricting flange, packing means disposed within the groove, and a damping valve device co-operating with the flange to control the flow of damping liquid into and out of the plunger element.

4. A telescopic shock absorbing suspension unit as claimed in claim 3, wherein the groove in the plunger element is substantially triangular in radial cross section.

5. In a telescopic shock absorbing suspension unit of the character described, a damping valve device comprising a constriction, a valve member, spring means urging said member to occupy normally a position in register with the constriction so as to block said constriction, controlling means actuated by the pressure fluid in the shock absorber, and a pair of stops operatively connected with the controlling means so that said controlling means brings one or other of the stops into action, depending upon whether the shock absorber is extended or shortened by comparison with its normal statically loaded length.

6. A shock absorbing suspension unit as claimed in claim 5, wherein the damping valve device comprises a valve plate which normally substantially closes a constriction in the plunger tube, a rod extending through the plate, a pair of spiders abutting on the wall of the constriction and holding the valve plate in its closed position, and a pair of projections on the rod, one or other of which projections presses the corresponding spider against the wall of the constriction and thus prevents the valve plate from opening in that direction under the effect of the pressure fluid.

7. A shock absorbing suspension unit as claimed in claim 5, wherein the damping valve device comprises a valve plate which normally substantially closes a constriction in the plunger tube, a rod extending through the plate, a pair of spiders abutting on the wall of the constriction and holding the valve plate in its closed position, a pair of projections on the rod and a pair of coiled compression springs interposed respectively between one of the spiders and the corresponding projection, one or other of which projections presses the corresponding spider against the wall of the constriction and thus prevents the valve plate from opening in that direction under the effect of the pressure fluid.

8. A shock absorbing suspension unit as claimed in claim 5, wherein the valve member comprises a block which has limited sliding play upon a rod connected with the controlling means and which is normally free to move in either direction out of the constriction, in response to unbalanced fluid pressure, the rod being movable axially under the action of the controlling means so as to cause the valve member to have a one-way action, except when the shock absorber is in equilibrium bearing its normal static load.

9. A shock absorbing suspension unit as claimed in claim 5, wherein the valve member comprises a block which has limited sliding play upon a rod connected with the controlling means and which is normally free to move in either direction out of the constriction, in response to unbalanced fluid pressure, the rod being movable axially under the action of the controlling means so as to cause the valve member to have a one-way action, except when the shock absorber is in equilibrium bearing its normal static load, and the block being cut away at its end parts to permit the passage of fluid through the constriction.

10. A shock absorbing suspension unit as claimed in claim 5, wherein the valve member comprises a block which has limited sliding play upon a rod connected with the controlling means and which is normally free to move in either direction out of the constriction, in response to unbalanced fluid pressure, the rod being movable axially under the action of the controlling means so as to cause the valve member to have a one-way action, except when the shock absorber is in equilibrium bearing its normal static load, and the rod having its axial movement limited to a distance substantially equal to the sliding play of the block relative to said rod.

11. In a telescopic shock absorbing suspension unit of the character described having a chamber containing liquid, a damping valve device and controlling means therefor comprising an auxiliary cylinder containing a fluid-tight floating piston, the space below said piston being filled with liquid in free communication with that in the chamber, a compression spring within the upper part of the auxiliary cylinder so as to act downwards upon the floating piston, and a controlling piston which is disposed within the liquid in the auxiliary cylinder and has packing means adapted to allow slow leakage of liquid from one side to the other, said controlling piston being connected with the damping valve device by an axial rod.

12. A telescopic shock absorbing suspension unit as claimed in claim 2, wherein the controlling means comprise an auxiliary cylinder containing a fluid-tight floating piston, the space below said piston being filled with liquid in free communication with that in the chamber, a compression spring within the upper part of the auxiliary cylinder so as to act downwards upon the floating piston, and a controlling piston which is disposed within the liquid in the auxiliary cylinder and has packing means adapted to allow slow leakage of liquid from one side to the other, said controlling piston being connected with the damping valve device by an axial rod.

13. In a telescopic shock absorbing suspension unit of the character described, a cylinder tube, a plunger tube slidable therein, and a damping valve device at the inner end of said plunger tube, a peripheral groove being formed in the plunger tube to provide within said plunger tube, an inwardly directed circumferential protuberance with which the damping valve device co-operates, said circumferential protuberance comprising a restriction arranged to receive said damping valve device and out of which said damping valve device can move longitudinally in either direction.

14. In a telescopic shock absorbing suspension unit of the character described, a cylinder tube, a plunger tube slidable therein, and a damping valve device at the inner end of said plunger tube, the plunger tube being of substantially uniform thickness throughout its length and having adjacent, but spaced from, its inner end a portion of reduced diameter producing an external groove and an inwardly directed circumferential protuberance with which latter the damping valve device co-operates.

15. A telescopic shock absorbing suspension unit as claimed in claim 14 having a packing ring which is disposed within the external groove in the plunger tube, and which slidably engages with the cylinder.

16. A telescopic shock absorbing suspension unit as set out in claim 13, including yieldable means for normally holding said damping valve device in a position in which the latter substantially blocks said restriction, said means being yieldable to permit longitudinal movement of said damping valve device in either direction out of said restriction.

PETER WARBORN THORNHILL.